Dec. 3, 1929.  A. V. BODINE  1,738,061
PHONOGRAPH
Filed April 23, 1925    2 Sheets-Sheet 1
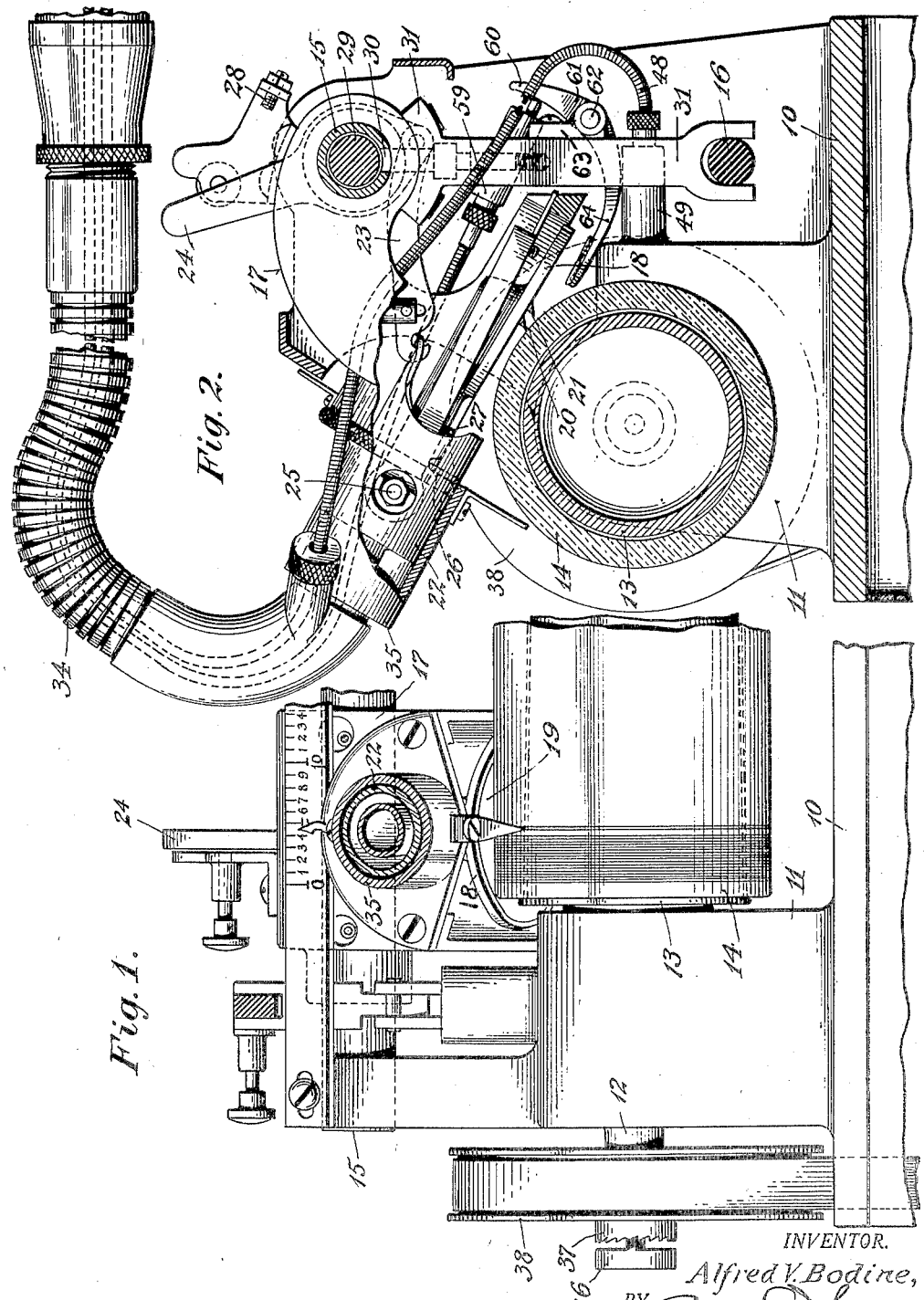
INVENTOR.
Alfred V. Bodine,
BY
ATTORNEY

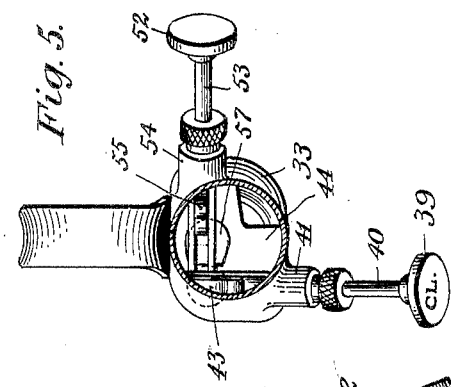
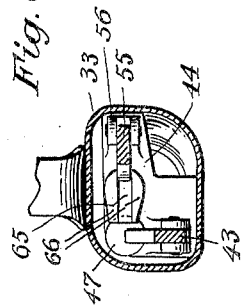
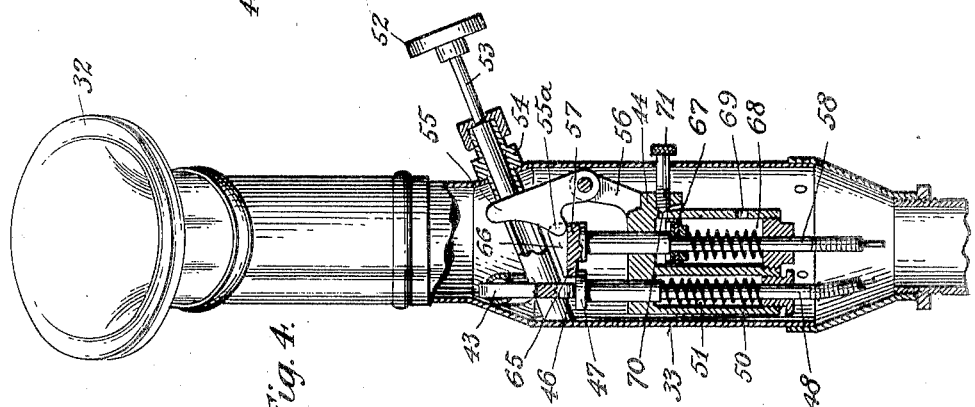
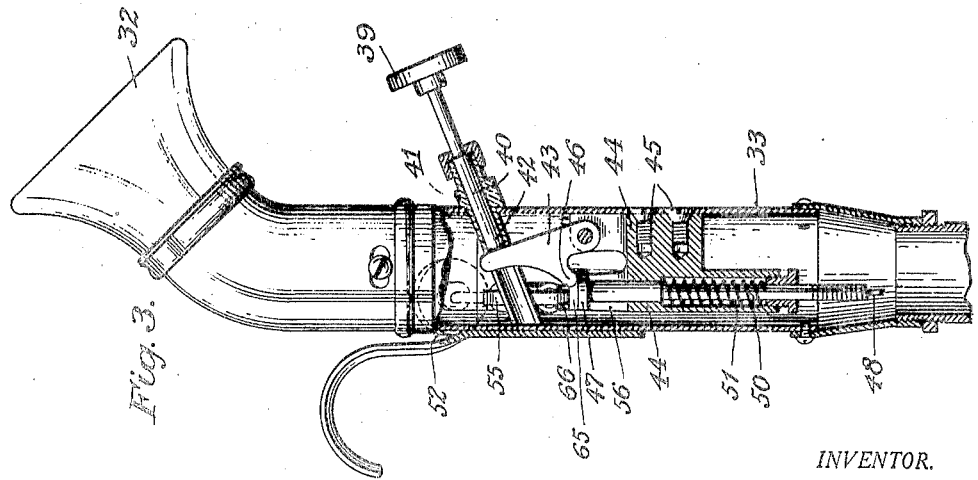

Patented Dec. 3, 1929

1,738,061

UNITED STATES PATENT OFFICE

ALFRED V. BODINE, OF BRIDGEPORT, CONNECTICUT, ASSIGNOR TO DICTAPHONE CORPORATION, OF BRIDGEPORT, CONNECTICUT, A CORPORATION OF NEW YORK

PHONOGRAPH

Application filed April 23, 1925. Serial No. 25,256.

This invention relates to phonographs, and in a more specific aspect to phonographs of the type used to record and reproduce dictation and other matter, such phonographs being known as commercial phonographs.

In using these machines, it sometimes occurs that the operator desires to skip a portion of the record-surface or move the recording-mechanism over the record-surface in advancing direction without engraving any lines upon the record-surface. This is done sometimes to indicate upon the record, by allowing a blank-space or gap to appear upon the record-surface, the length of dictation on a given subject.

For instance, to indicate the length of a letter, the gap or blank-space may be left on the record-surface between each successive letter or communication dictated. By observing the extent of recorded surface between gaps, the operator may determine approximately the length of the letter to be written and may locate the typewriting on the letter-sheet accordingly.

In other cases it is desired to advance the carriage for large extents in order to leave a blank-space for subsequent recording.

In order to provide this gap or to allow the leaving of a blank-space, the present invention provides means under the control of the operator for automatically advancing the carriage whenever desired.

The invention also provides means whereby the operator may control this advancing movement of the carriage from a point remote from the machine, for instance, from the speaking-tube used to transmit the sound from the person speaking to the phonograph.

The invention also provides means whereby the operator may produce either a gap of predetermined length or a blank-space of indefinite extent by simply operating and releasing the control in the first instance, or by maintaining the control operative for as long a time as necessary.

Other features and advantages will hereinafter appear.

In the accompanying drawings which illustrate one embodiment of this invention, that at present preferred, Figure 1 is a front elevation of a portion of a dictating machine, showing a gap which may be left upon the record-surface by the use of the present invention.

Fig. 2 is a side elevation, partly in section, of the dictating machine shown in Fig. 1, but more clearly showing certain parts provided by the present invention.

Fig. 3 is a longitudinal section of the handle of the speaking-tube showing the gap control as well as the usual clutch control.

Fig. 4 is a view similar to Fig. 3, but showing in a section taken on a different line, the gap control and the clutch control.

Fig. 5 is a top view of a section of the speaking-tube handle, showing the gap control and the clutch control.

Fig. 6 is a view similar to Fig. 5, but shows other details since the section is taken through an intermediate portion of the control device.

As shown in the accompanying drawings, the dictating machine comprises a base 10 having a vertical standard 11 in which is mounted a shaft 12 for a mandrel 13 adapted to support a record 14 for rotating movements. Also mounted in the standard 11 is a longitudinally disposed upper guide 15 and a lower guide 16 upon which is slidably mounted a carriage 17 for a sound-box 18 on whose diaphragm 19 there is provided a recording stylus 20 and a reproducing stylus 21.

The sound-box 18 is mounted in a slide 22 for longitudinal movement under the control of a link 23 connected to a lever 24 for the purpose of bringing either the recording stylus 20 or the reproducing stylus 21 into record-engaging position. The sound-box 18 is fulcrumed at 25 in the slide 22 to allow the styli to engage records of different thicknesses and so that the sound-box may be lifted bodily, to remove the styli from the record-surface, during the longitudinal movement of the slide 22 by the engagement of a stationary arm 26 with a cam 27 provided on the sound-box.

When the control-lever 24 is in its forward position, that shown in Fig. 2, the recording stylus 20 is in engagement with the record, but when the control-lever is shifted rearwardly until it engages an adjustable stop 28, the reproducing stylus 21 is in record-engaging position.

The carriage 17 is moved longitudinally of the guide-rods 15 and 16 during the operation of the phonograph, while the mandrel 13 and record 14 rotate, by means of an endless screw 29 located within the upper guide 15 and engaged by a nut 30 located in a depending arm 31 on the carriage, which arm reaches down to the guide-rod 16 and embraces this rod to hold the carriage steady. The feed-nut 30 passes through a longitudinal slot in the guide 15 into engagement with the feed-screw 29.

The sound to be recorded is transmitted to the sound-box 18 through a speaking-tube comprising a mouthpiece 32, a handle 33 and a flexible tube 34 to a nozzle 35 provided on the carriage and in communication with the sound-box 18. The sound so transmitted in this way, impinges upon the diaphragm 19 and causes the recording stylus to oscillate and engrave upon the record-surface an undulating groove corresponding to the sound which causes the oscillation of the diaphragm 19.

Likewise, when the control-lever 24 is in reproducing position, the reproducing stylus 21 engages this undulating groove and causes the diaphragm to vibrate and transmit sound through the tube 34 to the mouthpiece 32 which is then held to an ear of the user.

In order that the record-surface may not be consumed by the continued rotation of the record during intervals of pause in dictation, the mandrel 13 and screw 29 are normally inactive, that is when words are not being spoken in the mouthpiece. To make them operate, however, during the actual dictation, a clutch-member 36, connected to the mandrel and the feed-screw, is brought into engagement with a co-operating clutch-member 37 on a constantly rotating pulley 38. This clutch-member 36 is operated at a point remote from the machine itself, namely, from a point on the speaking-tube 34, so that as the dictator holds the mouthpiece before his lip, one of the fingers of his hand may engage a start-and-stop button 39 provided in the handle 33 of the speaking-tube.

The start-and-stop button 39, as usual, is mounted upon a stem 40 longitudinally movable in a guide 41 secured to the handle 33. At its inner end 42 the stem 40 engages the bell-crank lever 43 pivoted in a bracket 44 secured to the handle by screws 45. The arm 46 of the lever 43 engages a longitudinally movable head 47 of a Bowden-wire element 48, which Bowden-wire element enters the frame of the machine at 49, as shown in Fig. 2. The Bowden-wire element, the bell-crank 43 and the stop-and-start button 39 are normally held in, and when operated are returned to, normal position by a spring 50 located in a pocket 51 in the bracket 44. The operation of the button 39 and the Bowden-wire 48 causes the clutch-member 36 to be moved into engagement with the clutch-member 37 on the constantly rotating pulley 38, and thus causes the mandrel and feed-screw to rotate.

The above described mechanism is at present to be found in a well-known make of the commercial phonograph, now on the market, and in itself forms no part of the present invention.

To provide means for indicating upon the record-surface the length of matter dictated or for leaving blank spaces upon the record-surface for any purpose whatsoever, the present invention provides means, stated specifically, for raising the sound-box from the record and feeding the carriage while the sound-box is so raised. These means may be separate and distinct; i. e. one means may be provided for raising the sound-box from the record-surface while the other means may be provided for causing the feed-screw to advance the carriage while the sound-box is in this position.

However, it is at present considered preferable to provide a unitary member which is to be operated by the operator for performing the dual purpose of raising the sound-box from the record-surface and causing the feed-screw to advance the carriage. Moreover, it is at present considered preferable to provide this means at a point remote from the machine, on the speaking-tube handle 33, for instance, so that it will not be necessary for the operator to reach to the machine to operate the device.

To this end, the present invention provides a space-key 52 on the handle 33 of the speaking-tube which key, like the start-and-stop button 39, is on a stem 53 mounted in a tube or guide 54 provided in the handle 33. The inner end of the stem 53 engages a bell-crank 55 which is pivoted upon an extension 56 of the bracket 44 in which is also mounted the support for the bell-crank 43 of the start-and-stop mechanism.

The bell-crank 55 is provided with an arm 55ª engaging the head 57 of a Bowden-wire element 58 which passes from the speaking-tube 34 into the carriage 17 where one part of the Bowden-wire element 58 is anchored in a bracket 59 attached to the depending portion 31 of the carriage. The other element of the Bowden-wire 58 at this end is located in position to engage an arm 60 of a lifting-lever 61 pivoted at 62 in a bracket 63 carried by the depending portion 31 of the carriage. The other end of the lever 61 is provided with an arm 64 extending forwardly so as to normally be located under the sound-box 18. Hence, when the Bowden-wire 58 is operated by the depression of the button 52, the lever 61 is rocked on its pivot 62 so that its forwardly extending arm 64 raises the sound-box from the record-surface, allowing the carriage to move without permitting either stylus to engage the record-surface.

The other of the dual functions performed by the space-key 52 is, as stated above, to cause the mandrel 13 and feed-screw 29 to operate, so that the carriage actually does move while the sound-box is in elevated position. This is accomplished by providing an overlapping connection between the head 57 of the Bowden-wire 58 controlled by the button 52 and the head 47 of the Bowden-wire 48 controlling the start-and-stop of the machine. This overlapping connection may be formed by a simple extension 65 provided on the head 57, see Fig. 4, or may be provided in any other way which may occur to one skilled in the art.

But, when the extension 65 is provided, it is preferable to provide means for preventing the head 57 from turning so that its extension 65 will never be out of range of the head 47 of the start-and-stop Bowden-wire 48. To accomplish this, the head 57 is provided with a pair of upstanding flanges 66 into which the arm 55ª of the bell-crank 55 is located and which flanges prevent the head 57 from rotating.

Since the extension 65 of the head 57 of the Bowden-wire 58 is located on the top only of the head 47 of the Bowden-wire 48, the latter may be operated at any time without operating the former, therefore, the described start-and-stop device comprising the button 39 may function independently of the space-producing device.

It will be seen from the above disclosure that, when the space-button 52 is operated, not only is the sound-box 18 raised from the record-surface through the Bowden-wire 58, but the mandrel and feed-screw are caused to operate so as to advance the carriage while the sound-box is so raised from the record through the operation of the auxiliary Bowden-wire 58. This will then provide upon the record-surface, an unused or blank-portion, for the purpose described.

In order that a predetermined amount of space may be left upon each operation of the space-key 52, and so that this extent may be accurately measured, the head 57 of the Bowden-wire element 58 may be provided with a piston 67 operating in a cylinder 68 in the bracket 44, which piston and cylinder together act as a dashpot to retard the returning movement of the head 56. When the head is depressed upon the depression of the key 52, air is forced from the cylinder 68 through an aperture 69, but when the button 52 is released, which should be done immediately in case only a short gap is desired, the piston 67 compresses the air in the cylinder 68 and this compressed air retards the upward movement of the head 57 until the pressure within the cylinder is relieved by the escape of the air therein through a leak passage 70, which may be controlled by a regulating screw 71 extending to the exterior of the handle 33. After the air is exhausted from the cylinder 68 the head of the Bowden-wire element returns to normal position permitting the sound-box to again engage the record and the clutch-member 36 to disengage the pulley 38 and allowing the mandrel and feed-screw to stop rotating.

By regulation of the screw 71 so as to change the effective area of the leak passage 70, the duration of time during which the head 57 is kept in operative position may be controlled through wide limits, so that either a relatively short or long gap may be produced.

If the operator desires to have an extensive space upon the record, it is merely necessary to maintain the button 52 depressed, until it is seen that the carriage has travelled the desired amount, whereupon he may release the button 52 and after a predetermined time the mandrel and feed-screw will stop and the sound-box 18 will engage the record-surface.

It should be clearly understood that any other timing arrangement other than that shown, may be used to determine the extent of the gap and that this timing mechanism may be located in any convenient place in the train of connections. Nevertheless, it is found advantageous to provide this particular timing mechanism and to locate it in this particular place.

It should also be noted that the results obtained for the first time by this invention may be accomplished by other means which will now readily suggest themselves to those skilled in the art, and that when applying the invention to a different type of machine, it may be necessary to substantially vary the details of construction. Such changes are, however, contemplated by the present invention and are considered within its scope. As an example, take the case of a machine which is electrically controlled to start-and-stop. In this case, the start-and-stop mechanism may be energized concomitantly with the operation of means for raising the sound-box from the record. Further, in such electrically controlled machines it may even be desirable to raise the sound-box from the record by the use of an electro-magnet operating for the purpose instead of using the direct mechanical connection provided by the present invention.

Other variations and modifications may be made within the scope of this invention and portions of the improvements may be used without others.

Having described the invention, what is claimed as new, and for which it is desired to obtain Letters Patent, is:

1. In a phonograph, a record-support; a groove-producing recorder movable over the record-support to record upon a record carried by the record-support, and means controlled from a point remote from the phonograph for leaving an ungrooved zone upon the surface of the record.

2. In a dictating machine, a record-support; a recorder movable over the record-support; and means controlled from a point remote from the phonograph for automatically causing the recorder to move idly in advancing direction over the record-support and out of engagement with a record carried thereby.

3. In a phonograph, a record-support; a groove-producing recorder; means for moving the recorder over the record-support to record upon a record carried by the record-support; and means controlled from a point remote from the phonograph for causing the said moving means to idly feed the recorder in an advancing direction over said record-support to leave upon the record an ungrooved zone.

4. In a phonograph, a record-support; a sound-box movable over a record mounted on the record-support; a speaking-tube connected to the sound-box; and means mounted on the speaking-tube adapted to cause the sound-box to be raised from record-engaging position.

5. In a phonograph, a record-support; a groove-producing recorder movable over the record-support to record upon a record carried by the record-support; a speaking-tube connected to the recorder; and means mounted on the speaking-tube for leaving an ungrooved zone upon a record mounted on said record-support.

6. In a phonograph, a record-support; a sound-box movable over the record-support; a speaking-tube connected to the sound-box; and means on the speaking-tube for causing the sound-box to travel over a record mounted on said record-support and to be out of engagement with a record mounted on said record-support.

7. In a phonograph, a record-support; a groove-producing recorder movable over the record-support; means controlled from a point remote from the phonograph for leaving an ungrooved zone upon the surface of a record mounted on the record-support; and means for predeterminately controlling the extent of said ungrooved zone.

8. In a phonograph, a record-support; a groove producing recorder movable over the record-support; means manually controlled from a point remote from the phonograph for causing the recorder to idly move in advancing direction over the record-support without producing a groove; and means for predeterminately controlling the extent of said idle movement.

9. In a phonograph, a record-support; a sound-box movable over a record mounted on the record-support; a speaking-tube connected to the sound-box; means mounted on the speaking-tube adapted to cause the sound-box to be raised from record-engaging position; and means for maintaining said sound-box raised for a predetermined time interval.

10. In a phonograph, a record-support; a groove-producing recorder movable over the record-support; a speaking-tube connected to the recorder; means mounted on the speaking-tube for leaving an ungrooved zone upon a record mounted on said record-support; and means for predeterminately controlling the extent of said ungrooved zone.

11. In a recording phonograph, a groove-producing recorder; a speaking-tube; means on the speaking-tube for controlling the phonograph to leave an ungrooved zone upon a record between separate recordings; and means for controlling the extent of said ungrooved zone.

12. In a phonograph, a frame; a travelling sound-box mounted on the frame; a speaking-tube; and means on the speaking-tube for causing the forward-spacing of the sound-box with respect to the frame.

13. In a phonograph, a frame; a travelling sound-box mounted on the frame; a speaking-tube; and means on the speaking-tube for causing the forward-spacing of the carriage with respect to the frame for a predetermined extent upon each operation.

14. In a phonograph, a frame; a travelling sound-box mounted on the frame; a speaking-tube; and means on the speaking-tube for causing the sound-box to be spaced with respect to the frame.

15. In a phonograph, a frame; a travelling sound-box mounted on the frame; a sound-conveying device; and means on the sound-conveying device for causing the sound-box to be spaced with respect to the frame.

16. In a phonograph, a frame; a travelling sound-box mounted on the frame; a sound-conveying device; and means on the sound-conveying device for causing the sound-box to be spaced with respect to the frame a predetermined extent upon each operation of said means.

17. In a phonograph, a frame; a travelling sound-box mounted on the frame; a sound-conveying device; and a Bowden-wire element, having a manually operable part on said sound-conveying device, for causing the sound-box to be spaced with respect to the frame.

18. In a phonograph, a frame; a record-support mounted on the frame; a sound-box mounted on the frame to travel over the record; a sound-conveying device; and a Bowden-wire element, having a manually operable part on said sound-conveying device, for causing the sound-box to be removed from its record-engaging position.

19. In a phonograph, a frame; a travelling sound-box mounted on the frame; a sound-conveying device; and a Bowden-wire element, having a manually operable part on said sound-conveying device, for causing the sound-box to be spaced forward, that is, in its direction of advancing movement, with respect to the frame.

20. In a phonograph, a frame; a travelling sound-box mounted on the frame; a sound-conveying device; a Bowden-wire element, having a manually operable part on said sound-conveying device, for causing the sound-box to be spaced forwardly; that is, in its direction of advancing movement, with respect to the frame; and means for maintaining the Bowden-wire element operative until the sound-box has been forwardly spaced a predetermined extent.

21. In a phonograph, a frame; a travelling sound-box carriage mounted on the frame; a sound-conveying device; a Bowden-wire element, having a manually operable part on said sound-conveying device, for causing the sound-box to be spaced forwardly, that is, in its direction of advancing movement, with respect to the frame and a dash-pot for maintaining the Bowden-wire element operative until the sound-box has been forwardly spaced a predetermined extent.

22. In a phonograph, a frame; a sound-box movable thereon; a sound-conveying device; and a key mounted on said sound-conveying device and which when operated causes the sound-box to move relatively to said frame.

23. In a phonograph, a frame; a sound-box movable thereon; a sound-conveying device; and a space-key mounted on said sound-conveying device and which when operated causes the sound-box to receive a spacing movement.

24. In a phonograph, a frame; a sound-box movable thereon; a sound-conveying device comprising a handle; and a space-key mounted on said handle and which when operated causes the sound-box to receive a spacing movement.

25. In a recording phonograph, a sound pick-up device; mechanism for starting and stopping the phonograph; means for causing to be left upon a record a delineating unrecorded zone after one recording and before the next recording; means on the sound pick-up device for controlling said starting and stopping mechanism; and means on the sound pick-up device for controlling the unrecorded zone producing means.

26. In a recording phonograph, a sound pick-up tube; means on the phonograph for causing to be left a delineating unrecorded zone after one recording and before the next recording; and means on the sound pick-up device for controlling the last named means.

27. In a recording phonograph, a sound pick-up device; means for visually marking-off on a record separate recordings produced upon the record; and means adjacent the sound pick-up device for controlling the last named means.

28. In a dictation machine, the combination of a carriage; a sound box; means on the carriage for controlling the position of the sound-box; a speaking-tube connected to the sound-box; and means on the speaking-tube for operating the sound-box control.

Signed at Bridgeport, in the county of Fairfield, and State of Connecticut, this 2nd day of April, 1925.

ALFRED V. BODINE.